United States Patent [19]

Sakuma et al.

[11] Patent Number: 4,848,035
[45] Date of Patent: Jul. 18, 1989

[54] STRUCTURE OF A WEATHERSTRIP FOR AN AUTOMOTIVE VEHICLE

[75] Inventors: Hiroshi Sakuma; Yuuji Sakamaki, both of Chiba, Japan

[73] Assignee: Kinugawa Rubber Industrial Co., Ltd., Chiba, Japan

[21] Appl. No.: 221,270

[22] Filed: Jul. 19, 1988

[30] Foreign Application Priority Data

Jul. 20, 1987 [JP] Japan ................................ 62-180758

[51] Int. Cl.$^4$ ............................................... E06B 7/16
[52] U.S. Cl. .......................................... 49/491; 49/497
[58] Field of Search .................. 49/491, 490, 497, 498

[56] References Cited

U.S. PATENT DOCUMENTS

| | | | |
|---|---|---|---|
| 4,495,234 | 1/1985 | Tominaga et al. | 49/498 X |
| 4,513,044 | 4/1985 | Shigeki et al. | 49/498 X |
| 4,603,899 | 8/1986 | Iwasa | 49/490 X |
| 4,702,039 | 10/1987 | Bocchinfuso | 49/490 |
| 4,745,016 | 5/1988 | Hashimoto et al. | 49/497 X |

FOREIGN PATENT DOCUMENTS 2748682 5/1978 Fed. Rep. of Germany ........ 49/491

OTHER PUBLICATIONS

Japanese Utility Model Application No. 61-1791-14-1986.

Primary Examiner—Philip C. Kannan
Attorney, Agent, or Firm—Bachman & LaPointe

[57] ABSTRACT

A structure of a weatherstrip applicable to a door portion or a trunk lid and a vehicle body is disclosed in which one of grasping lips impinged on a flange portion of an opening edge of the vehicle body so as to grasp the flange portion and sub-lip integrally formed at an end edge of a weatherstrip main body so as to extend toward the outside portion of the vehicle body are seesawed with a linkage portion between the grasping lip and sub-lip as a fulcrum. When the weatherstrip main body is inserted onto the flange portion, a tip portion of the corresponding grasping lip is abutted with the outside surface of the flange portion and is easily pivoted toward the outside of the flange portion with the linkage portion as the fulcrum. When the tip portion of the grasping lip is pivoted toward the outside portion of the flange portion, its reaction force causes the sub-lip to pivot toward the internal direction so that its tip portion is impinged on the end surface of the vehicle body.

21 Claims, 3 Drawing Sheets

STRUCTURE OF A WEATHERSTRIP FOR AN AUTOMOTIVE VEHICLE

CROSS REFERENCE TO RELATED APPLICATIONS

The instant application is released to copending U.S. patent application Ser. No. 077,370, filed on June 24, 1987 and Ser. No. 155,117, filed on Feb. 11, 1988.

BACKGROUND OF THE INVENTION (1) Field of the Invention

The present invention generally relates to an improvement in a structure of a weatherstrip for sealing a space between, e.g., an opening edge of a vehicle body and a trunk lid thereof.

(2) Background of the Art

A Japanese Utility Model Application First Publication (non-examined) Sho 61-179114 published on Nov. 8, 1986 exemplifies a previously proposed structure of the weatherstrip.

In the above-identified Japanese Utility Model Application Publication, a hollow sponge rubber (rubber foam) sealing portion is disposed on an upper part of a welt, as a main body of the weatherstrip, made of a solid rubber having a substantially letter-U shaped cross section.

In addition, a plurality of lips are extended toward an inside space of the welt from both opposing surfaces of side parts of the welt.

Furthermore, a sub-lip extended externally from one of the lips is disposed on a base end of one of the side parts of the welt. The sub-lip is faced toward an outside of a vehicle body. The sub-lip serves to prevent liquid such as water from invading into the inside of the vehicle body via a flange portion to be described below.

When the above-described welt is inserted into the flange portion extended upward and disposed on an opening edge of the vehicle body, each lip is impinged so as to grasp the flange portion to prevent a rolling of the welt and the sub-lip is brought in contact with an end outside surface of the vehicle body so as to prevent water or dirt from invading into the inside of the vehicle body.

In the structure of the weatherstrip described above, the sub-lip is continuously extended from the opposing lower lip and the end of the side part placed at an external side of the vehicle body is relatively thick as compared with the lower lip and welt so that a high rigidity of a base end of the welt is ensured. Therefore, since there is not direct relationship between the lower lip and sub-lip, it is difficult and troublesome insert the welt into the flange portion due to the high rigidity of the base end placed between the lower lip and the sub-lip. In addition, the sub-lip is not easily contacted with the end surface of the vehicle body under pressure.

SUMMARY OF THE INVENTION

It is an object of the present invention to provide a structure of a weatherstrip applicable to a flange portion placed on an opening edge of a vehicle body which is capable of easily inserting a welt of the weatherstrip into the flange portion of the vehicle body and whose sub-lip is easily contacted with an end surface of the vehicle body.

The above-described object can be achieved by providing a structure of a weatherstrip, comprising: (a) a main body having a cross sectional structure such as to accommodate both side surfaces of a projecting member with a space defined by the main body and both side surfaces of the projecting member; (b) at least one first lip extended toward a first side surface of the projecting member from an inside surface of the main body so that a tip portion of the first lip is pressed against the first side surface of the projecting member when the main body is rested on the projecting member; (c) at least one second lip extended toward a second side surface of the projecting member from one free end of the inside surface of the main body; and (d) a third lip extended toward a third surface of a part of the projecting member which is substantially vertical to the second surface from the face end of the inside surface of the main body linked with the second lip, both second lip and third lip being a seesaw configuration with the free end of the inside surface of the main body as a fulcrum.

The above-described object can also be achieved by providing a structure of a weatherstrip applicable to a space between a door portion and an associated vehicle body, comprising: (a) a main body; (b) a plurality of lips projected from the main body toward an inner space defined by the main body so as to grasp a flange portion extended at an opening edge of the vehicle body, a first lip thereof being extended from an end edge of the main body facing toward an outside surface of the vehicle body; and (c) a sub-lip projecting from one end of the first lip toward the outside surface of the vehicle body, with a direct extension relationship to the first lip.

The above-described object can also be achieved by providing a structure of a weatherstrip applicable to a space between a trunk lid and an associated vehicle body, comprisinig: (a) a main body; (b) a plurality of lips projected from the main body grasp a flange portion extended at an opening edge of the vehicle body, a first lip thereof being extended from an end edge of the main body facing toward an outside surface of the vehicle body; and (c) a sub-lip projecting from one end of the first lip toward the outside surface of the vehicle body with a direct extension relationship to the first lip.

DETAILED DESCRIPTION OF THE PREFERRED EMBODIMENTS

Reference will hereinafter be made to the drawings in order to facilitate understanding of the present invention.

Figure 1:
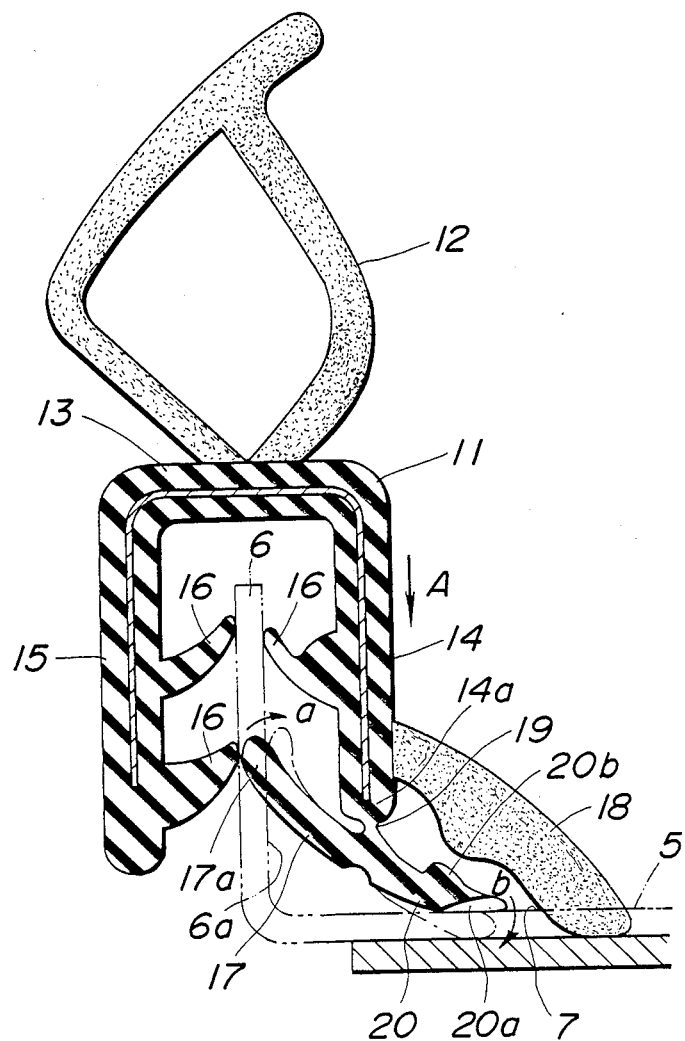
FIG. 1 is a cross sectional view of a weatherstrip structure in a first preferred embodiment according to the present invention.
Figure 2:
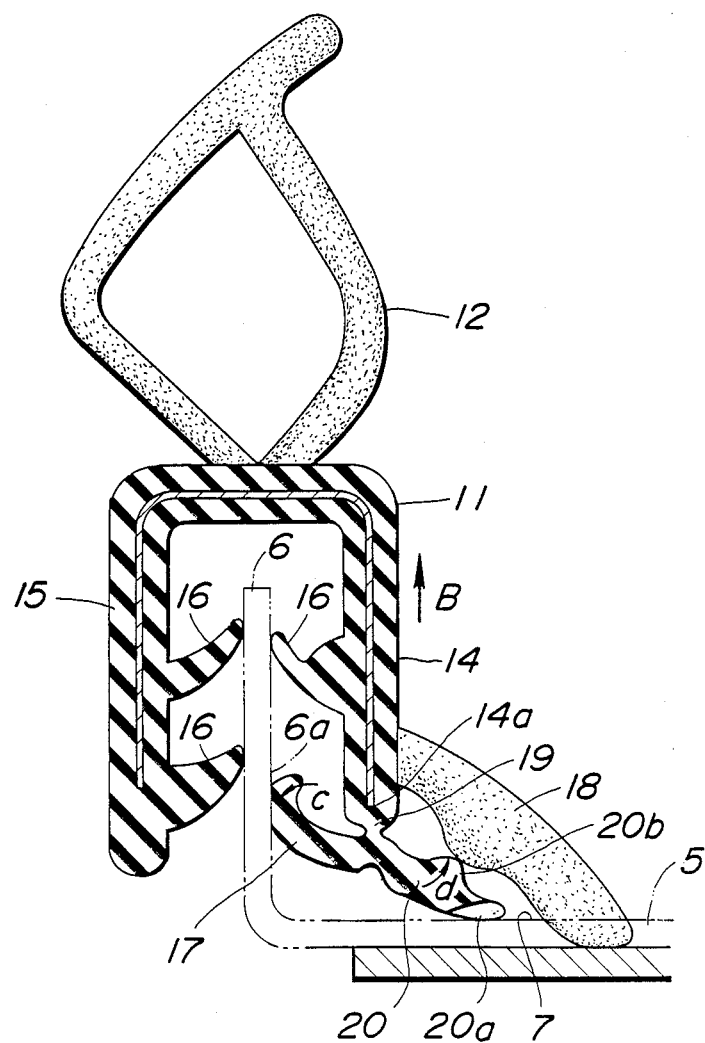
FIG. 2 is a cross sectional view of the weatherstrip structure for explaining an operation of the first preferred embodiment shown in FIG. 1.

FIGS. 1 and 2 show a first preferred embodiment of the weatherstrip structure according to the present invention.

In the first preferred embodiment, the weatherstrip structure is applied to a space between a vehicle body generally denoted by 5 and a rear door portion. A welt denoted by 11 is a main body of the weatherstrip made of a solid rubber and has a substantially letter U-shaped cross section. A hollow sealing portion 12 is disposed on an upper part 13 of the welt 11 and is to be brought in close contact with a peripheral edge of the rear door portion. The sealing portion 12 is made of a sponge rubber (rubber foam). A plurality of grasping lips 16, 17 are disposed so as to extend internally from both side parts 14, 15 of the welt 11. A seal lip 18 made of the sponge rubber is provided on an outer surface of a lower end 14a of one side part 14 of the welt 11 located on the outside of the vehicle body. The seal lip 18 is contacted with an end surface 7 of an opening of the vehicle body 5 so as to prevent an inclination of the welt 11.

In addition, a thin linkage portion 19 is integrally extended along an elongated direction of a lower edge of the lower end 14a. The grasping lip 17 is formed on the inside of the lower peripheral edge of the linkage portion 19 and a sub-lip 20 is integrally extended from the outside of the linkage portion 19. It is noted that both lips 17, 20 are formed in a seesaw configuration such as to pivot with the linkage portion 19 as a fulcrum.

Furthermore, the sub-lip 20 as a tip portion 20a formed of the sponge rubber and has a projection portion 20b at an upper part thereof which is contacted with an inner side projecting surface of the seal lip 18. The projection portion 20b is extended along the elongated direction of the seal lip 20.

It is noted that as viewed from FIGS. 1 and 2 a position of the linkage portion 19 is slightly higher than an opposing base end of the side part 15 of the welt 11 and a thin iron plate is extended in the welt 11 in a slightly asymmetrical state.

Next, an operation of the first preferred embodiment will be described below.

When the welt 11 is pressed and inserted in a direction denoted by an arrow with an arrow toward a flange portion 6 located on the opening edge of the vertical body 5, the tip portion 17a of the grasping lip 17 is abutted with the outside surface 6a of the flange portion 6 and is easily pivoted and inclined toward an outer direction denoted by a with an arrow (refer to a dot-and-dash line).

Hence, an insertability of the welt 11 into the flange portion 6 becomes favorable and thereby an efficiency of assembly operation is improved.

On the other hand, with the tip portion 17a of the grasping lip 17 tilted toward the outside of the flange portion 6, its reaction force causes the sub-lip 20 to pivot and tilt in the inside direction denoted by b with an arrow (refer to the dot-and-dash line). Upon the end of the insertion of the welt 11, the tip portion 20a is brought in close contact with the opening end surface 7 under pressure.

Hence, a sealing performance between the inside and outside of the vehicle body is improved by means of the sub-lip 20 and therefore a water-tight structure can be assured.

In addition, since a pressure is provided for the grasping lip 17 due to the internal pivot of the grasping lip 17 caused by a reaction of the high pressure of the seal lip 20 applied to the opening end surface 7, a grasping force to the flange portion 6 is improved.

Since at this time the seal lip 18 is also abutted with the opening end surface 7 of the vehicle body, the seal lip 18 and the sub-lip 20 provide a double sealing characteristic so that the sealing preformance will remarkably be improved.

When the welt 11 is attached to, e.g., an upper side of the opening edge of the vehicle body and a force is imposed in a direction (direction B with an arrow mark) falling down from the flange portion 6 due to its own weight, as shown in FIG. 2, the grasping lip 16 pivots toward the inner direction (direction c with an arrow mark) due to the friction against the outside surface 6a of the flange portion 6. Therefore, the sub-lip 20 pivots upward (direction d with an arrow mark). At this time, a reaction force is generated on the projecting portion 20b which is impinged on the inner side projecting surface of the seal lip 18. Hence, the pressing force of the grasping lip 17 against the outside surface 6a of the flange portion 6 becomes remarkably increased so that a retentive force of the grasping lip 17 is reinforced. Consequently, the falling down of the welt 11 can positively be prevented.

Figure 3:
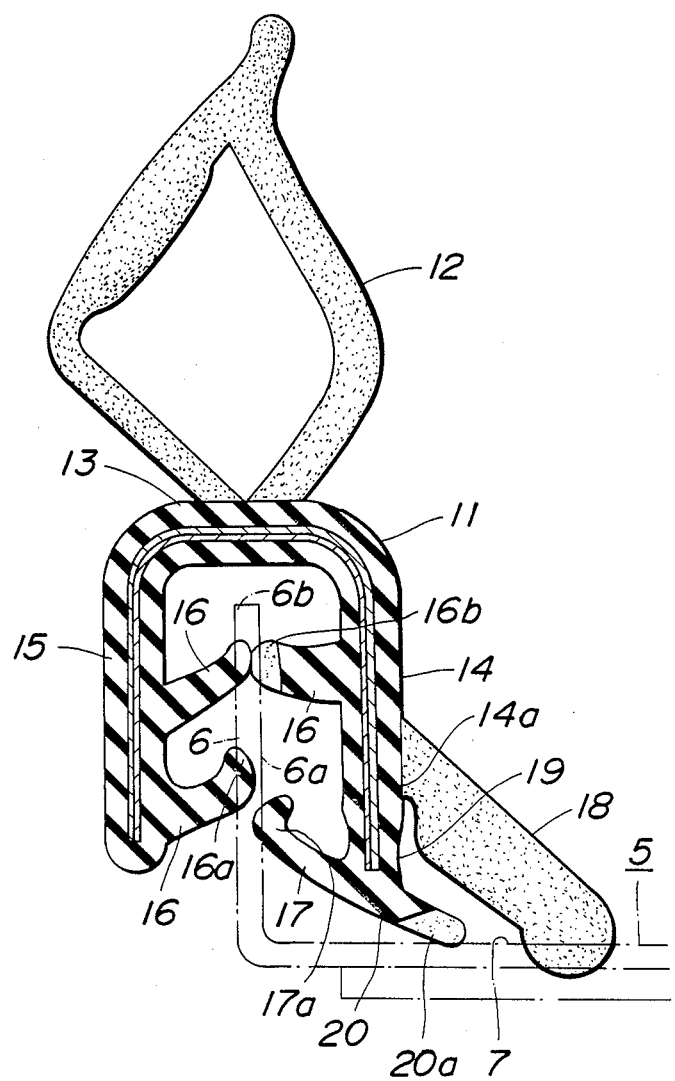
FIG. 3 is a cross sectional view of the weatherstrip structure in a second preferred embodiment according to the present invention.

FIG. 3 shows a second preferred embodiment of the weatherstrip structure.

In the second preferred embodiment, the lower end portion 14a of one side part 14 located at the inner side of the vehicle is extended downward.

Therefore, a mounting position of the grasping lip 17 installed on the lower end portion via the linkage portion 19 is placed at a lower position than the mounting portion of the grasping lip 16 installed at the lower end of the side part 15. The opposing positions of both tip portions 16a, 17a are offset in the upper and lower directions.

Hence, in a case when the welt 11 is pressed and inserted into the flange portion 6 in the same way as in the first preferred embodiment, the tip portion 6b of the flange portion 6 is impinged on the tip portion 17a of the grasping lip 17 and subsquently impinged on the tip portion 16a of the grasping lip 16 at the opposite side of the tip portion of the grasping lip 17. Consequently, the insertability of the welt 11 into the flange portion 6 becomes remarkably increased together with the seesaw configuration described in the first preferred embodiment. Especially, the insertability becomes increased when the welt 11 is once inserted into the flange portion 6, thereafter, is pulled out of the flange portion 6, and then again inserted thereinto. That is to say, since the tip portions 16a, 17a of both grasping lips 16, 17 are offset, both tip portions 16a, 17a are not deformed and abutted with each other interfering together with the flange portion but the appropriate tilting postures toward the inside of the flange portion in the same way as the original state are individually maintained. Consequently, the first insertability and second insertability become favorable and the efficiency of assembly operation is more remarkably increased.

Although in the second preferred embodiment the side part 14 at the vehicle body inside is extended in the downward direction, it is possible to shorten the length of the one side part 15 at the vehicle body outside with the relative positional relationship to the length of the flange portion 6 taken into consideration. The other construction is the same as that in the first preferred embodiment.

It is noted that since the tip portion 16b of the upper grasping lip 16 of the side part 14 at the vehicle inside portion is formed of the sponge rubber, the grasping lip 16 against the outside surface 6a of the flange 6 is more tightly sealed.

Although in both preferred embodiment the weatherstrip structure is applied to the space between the vehicle door and rear door portion, the weatherstrip structure according to the present invention is also applicable to a space between the vehicle body and another door portion of the vehicle or a trunk portion.

As described hereinabove, since the weatherstrip structure according to the present invention has the seesaw configuration at the grasping lip and sub-lip via the linkage portion, the insertability thereof is increased due to the easy pivoting of the grasping lip at the time of the insertion of the welt into the flange portion. The pressing force of the sub-lip against the end surface of the vehicle body becomes large since the pivoting force is applied to the sub-lip in the same direction as the pivoting force of the grasping lip at the time of end of the insertion. Therefore, the high sealing performance and water temperature can be achieved.

What is claimed is:

1. A structure of a weaterstrip, comprising:
   (a) a main body having a cross sectional strucuture member with a space defined by the main body and both side surfaces of the projecting member;
   (b) at least one first lip extended foward a first side surface of the projecting member from an inside surface of the main body so that a tip side surface of the projecting member when the main body is rested on the projecting member;
   (c) at least one second lip extended toward a second side surface of the projecting member from one free end of the inside surface of the main body; and
   (d) a third lip extended toward a third surface of a part of the projecting member which is substantially vertical to the second surface from the free end of the inside surface of the main body linked with the second lip, both second lip and third lip being a seesaw configuration with the free end of the inside surface of the main body as a fulcrum.

2. The structure ass set forth in claim 1, wherein the main body and the first, second, and third lips are integrally formed.

3. The structure as set forth in claim 1, wherein an edge of the free end of the inside surface of the main body is relatively thin.

4. The structure as set foth in claim 1, wherein the main body has a substantially letter U-shape cross section.

5. The structure as set forth in claim 1, wherein the main body comprises a solid rubber member.

6. The structure as set forth in claim 1, which further comprises a fourth lip extended toward the second side surface of the projecting member from the inside surface of the main body.

7. The structure as set forth in claim 6, wherein all free ends of the first, second, and fourth lips are pressed against the first and second surfaces of the projecting member so as to face toward a tip end of the projecting member.

8. The structure as set forth in claim 6, wherein a tip portion of the fourth lip is made of a sponge rubber.

9. The structure as set forth in claim 1, which further comprises a sponge rubber member extended from an opposite surface of the main body toward the third surface of the projecting member.

10. The structure as set forth in claim 9, wherein an intermediate surface of the sponge rubber member is projected toward an opposing surface of the third lip which is projected toward the intermediate surface of the songe member.

11. The structure as set forth in claim 1, wherein a free end of the third lip is made of a sponge rubber.

12. The structure as set forth in claim 1, wherein a relatively thin iron plate is extended in the main body for reinforcing the main body.

13. The structure as set forth in claim 1, wherein the projecting member is a flange portion of a vehicle body and the third surface of the projecting member faces toward an outside of the vehicle body.

14. The structure as set forth in claim 13, wherein a continuous space is provided between the inner surface of the main body and the tip of the flange portion.

15. The structure as set forth in claim 1, which further comprises a hollow sponge member extended vertically from an outer surface of the main body.

16. A structure of a weatherstrip applicable to a space between a door portion and an associated vehicle body, comprising:
    (a) a main body;
    (b) a plurality of lips projected from the main body toward an inner space defined by the main body so as to grasp a flagne portion extended at an opening edge of the vehicle body, a first lip thereof being extended from an end edge of the main body facing toward an outside of the vehicle body; and
    (c) a sub-lip projecting from one end of the first lip toward the outside surface of the vehicle body with a direct extension relationship to the first lip.

17. The structure as set forth in claim 16, wherein the main body, the plurality of lips, and the sub-lip are integrally made of a solid rubber.

18. The structure as set forth in claim 17, wherein a linkage portion between the first lip and sub-lip is relatively thin.

19. The structure as set forth in claim 17, wherein a linkage portion between the first lip and sub-lip has the substantially same thickness as the first lip and/or sub-lip.

20. The structure as set forth in claim 16, wherein the flange portion is substantially orthogonal to the outside surface of the vehicle body.

21. A structure of a weatherstrip applicable to a space between a trunk lid and an associated vehicle body, comprising:
    (a) a main body;
    (b) a plurality of lips projected from the main body toward an inner space defined by the main body so as to grasp a flange portion extended at an opening edge of the vehicle body, a first lip thereof being extended from an end edge of the main body facing toward an outside of the vehicle body; and
    (c) a sub-lip projecting from one end of the first lip toward the outside surface of the vehicle body with a direct extension relationship to the first lip.

* * * * *